(12) United States Patent  
Ichimura

(10) Patent No.: US 6,747,221 B2
(45) Date of Patent: Jun. 8, 2004

(54) LEVER SWITCH AND COMPOSITE SWITCH USING THE SAME

(75) Inventor: Takashi Ichimura, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/378,923

(22) Filed: Mar. 5, 2003

(65) Prior Publication Data

US 2003/0221942 A1 Dec. 4, 2003

(30) Foreign Application Priority Data

Mar. 7, 2002 (JP) ........................... 2002-061442

(51) Int. Cl.⁷ .................. H01H 9/00; H01H 21/00; H01H 25/06
(52) U.S. Cl. ................................. 200/61.54
(58) Field of Search ............ 200/61.54–61.57, 200/61.27–61.38, 293–307

(56) References Cited

U.S. PATENT DOCUMENTS

| | | | | |
|---|---|---|---|---|
| 5,744,769 A | * | 4/1998 | Proctor et al. ............ | 200/61.54 |
| 5,786,554 A | * | 7/1998 | Umezawa et al. ......... | 200/61.54 |
| 5,920,047 A | * | 7/1999 | Akimoto et al. ......... | 200/61.54 |
| 5,936,215 A | * | 8/1999 | Masuda et al. ............ | 200/61.3 |
| 6,034,338 A | * | 3/2000 | Uchiyama ................. | 200/61.27 |
| 6,441,327 B1 | * | 8/2002 | Shibata et al. ............ | 200/61.27 |
| 6,624,366 B2 | * | 9/2003 | Uchiyama et al. ........ | 200/61.54 |

FOREIGN PATENT DOCUMENTS

| | | |
|---|---|---|
| JP | 10-162694 | 6/1998 |
| JP | 2001-110281 | 4/2001 |

* cited by examiner

*Primary Examiner*—James R. Scott
(74) *Attorney, Agent, or Firm*—Wenderoth, Lind & Ponack, L.L.P.

(57) ABSTRACT

A lever switch has a housing with an opening, a slider slidably accommodated in the housing, and a lever engaged with the slider for causing sliding of the slider and projecting from the housing via the opening. A cover is mounted to the housing to cover the opening. A knob is mounted to and surrounds the lever and has a base end portion that faces the cover and through which the lever extends. One of the cover and the base end portion of the knob is convex, and the other is concave so that the cover and base end portion of the knob have generally mutually complementary shapes facing each other.

12 Claims, 3 Drawing Sheets

US 6,747,221 B2

LEVER SWITCH AND COMPOSITE SWITCH USING THE SAME

FIELD OF THE INVENTION

The present invention relates to lever switches to be used in vehicles and composite switches using the same lever switches.

BACKGROUND OF THE INVENTION

A lever switch used in a vehicle is mounted near a steering wheel. The lever switch is used in switching of functional equipment such as headlights, blinkers, wiper motors that activate windshield wipers on a front and a rear windshield, a washer motor that sprays wash fluid onto the windshield, and the like.

The foregoing conventional lever switch is described hereinafter with reference to FIG. 3 which shows a partial sectional view of the conventional lever switch.

A box-shaped insulating housing 1 made from resin has an opening on its right side. A slider 2 is accommodated in the housing 1 in a slidable manner. On the rear face and lateral (side) faces of slider 2, movable contacts (not shown) are provided. The movable contacts can be moved into and out of contact with fixed contacts (not shown) provided on the bottom or side faces of the housing 1 by sliding the slider 2, so that electrical on-off switching is carried out. Switch contacts 3 are thus formed. The left end (base end) of a lever 4 engages with the slider 2. The lever 4 protrudes from an opening 1A of the housing 1 in a rockable manner. On the right end (distal end) of the lever 4, a knob 5 is mounted. A rotary operating section 5A provided at the tip of the knob 5 accommodates a rotary switch 6. A lead wire 7 couples the rotary switch 6 in the knob 5 to a printed circuit board (not shown) in the housing 1. The lead wire 7 extends through an opening 5B on the left end (base end) of the knob 5 and an opening 1A of the housing 1.

In the structure discussed above, the knob 5 moves back and forth or up and down, thereby moving the lever 4 mounted to the knob 5, and causing sliding of the slider 2 in the housing 1 with respect to the contacts 3 formed between the slider 2 and the housing 1 so as to carry out electrical on-off switching. The electric signal produced by this electrical on-off switching is transmitted to an electronic circuit (not shown) of the vehicle, so that e.g., the headlights are switched.

A rotation of the operating section 5A disposed at the right end (distal end) of the knob 5 carries out electrical switching of the rotary switch contact 6 in the knob 5. The electric signal produced by this electrical switching is transmitted to the electronic circuit of the vehicle via the lead wire 7, to thereby operate the motors.

However, the foregoing conventional structure has the problem that an operator of the lever can see inside of the housing 1 and the knob 5, and can view the lead wire 7 running therethrough via a gap between the opening 1A of the housing 1 and the opening 5B of the knob 5. This arrangement looks bad and damages the appearance of the switch. Further, the lead wire is exposed to damage every time the lever is operated, which is a problem from a safety standpoint.

The present invention addresses the problems discussed above and aims to provide a good looking lever switch and a composite switch using the same lever switch.

SUMMARY OF THE INVENTION

The present invention provides a lever switch comprising:
a housing having an opening;

a slider slidably accommodated in the housing for sliding movement to cause electrical switching within the housing;

a lever engaged with the slider for causing sliding of the slider, the lever having a base end portion provided in the housing and engaged with the slider, and a distal end portion projecting outwardly from the housing via the opening;

a cover mounted to the housing to cover the opening thereof; and a knob mounted to and surrounding the distal end portion, the knob having a base end portion facing the cover, and the base end portion of the knob having an opening through which the lever extends;

wherein one of the cover and the base portions of the knob is convex toward the other of the cover and the base portion of the knob, and the other of the cover and the base portion of the knob is concave toward the one of the cover and the base portion of the knob, such that the cover and the base portion of the knob have mutually complementary shapes facing each other.

DESCRIPTION OF PREFERRED EMBODIMENT

Figure 1:
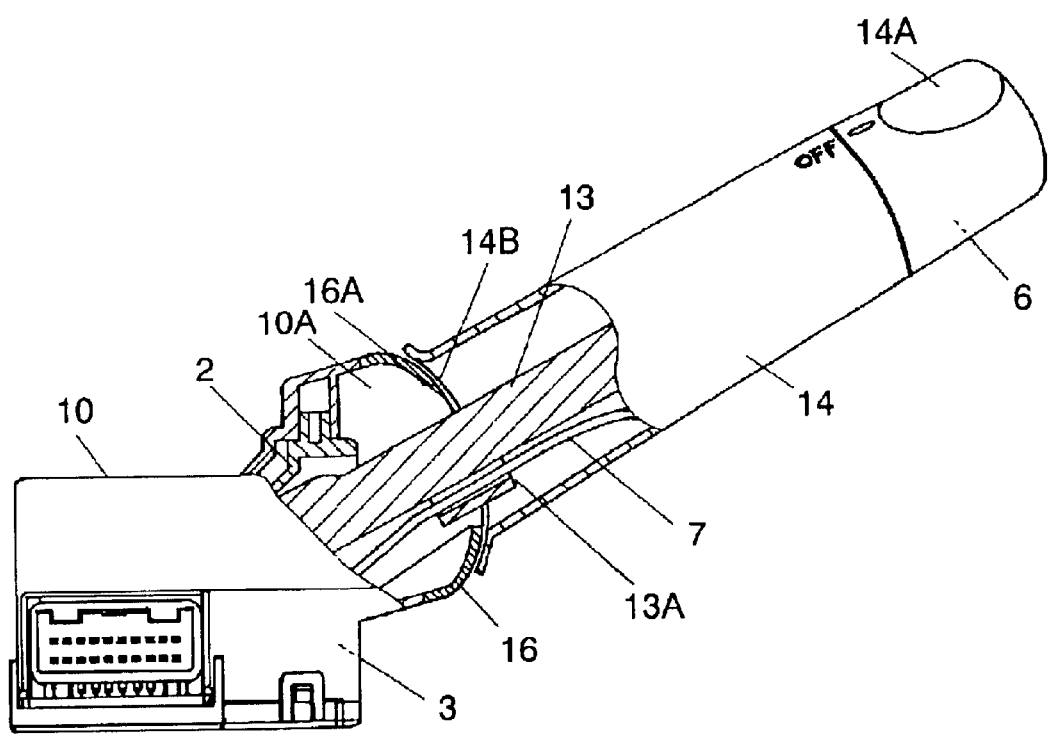
FIG. 1 shows a partial sectional view of a lever switch in accordance with an exemplary embodiment of the present invention.

An exemplary embodiment of the present invention is described hereinafter with reference to FIG. 1 and FIG. 2. Elements similar to the elements described in the Background of the Invention have the same reference characters and further detailed descriptions thereof are omitted.

Exemplary Embodiment

In FIG. 1, a box-shaped housing 10 made from insulating resin has an opening 10A on its right side. A slider 2 is accommodated in the housing 10 in a slidable manner. On the rear face and lateral (side) faces of the slider 2, movable contacts (not shown) are provided. Those movable contacts can be moved into and out of contact with fixed contacts (not shown) provided on the bottom or lateral (side) faces of the housing 10 by sliding the slider 2, so that electrical on-off switching is carried out. Switch contacts 3 are thus formed.

The left end (base end) of a lever 13 engages with the slider 2. The lever 13 protrudes from the opening 10A of the housing 10 in a rockable manner. On the right end (distal end) of the lever 13, a knob 14 is mounted. A rotary operating section 14A is provided at the tip of the knob 14 to accommodate a rotary switch 6.

A hollow cover 16 made from insulating resin covers the opening 10A of the housing 10. A right-side face 16A of the cover 16 protrudes like a cup (i.e. is concave) at its center toward the knob 14. A periphery of an opening 14B at the left end (base end) of the knob 14 is opposite to the side face 16A of the cover 16. As shown in FIG. 1, the base end of the knob 14 is spaced from the cover 16 via a small clearance and is recessed like a cup (concave) to be complementary in shape to the right-side face 16A of the cover 16. This structure prevents an operator of the lever from seeing inside the housing 10, the cover 16 and the knob 14 through the clearance between the side face 16A of the cover 16 and the base end of the knob 14.

Further, a lead wire 7 couples electrical elements such as the rotary switch 6 and an illuminating section (not shown) at the end of the knob 14 to electrical elements such as a printed circuit board and the switch contacts 3 in the housing 10. The lead wire 7 runs through a communicating tube 13A provided on the lever 13 at a position aligned with the junction of the cover 16 with the knob 14. A lever switch is thus constructed. In this construction, a rocking movement of the knob 14 back and forth or up and down rocks the lever 13 mounted to the knob 14.

The slider 2 slides in the housing 10, so that the switch contacts 3 formed between the slider 2 and the housing 10 carry out electrical on-off switching. An electric signal produced by this electrical on-off switching is transmitted to an electric circuit (not shown) of the vehicle, thereby switching, e.g., the headlights. The side face 16A of the cover 16 faces opposite to the base end of the knob 14, and one of them protrudes like a cup and the other is recessed like a cup (i.e. one is convex and one is concave), thereby facing each other in a generally complementary manner. During the rocking operation of the lever, this structure prevents an operator of the lever from seeing inside the housing 10, the cover 16, and the knob 14, or from seeing the lead wire 7 running through the clearance between the side face 16A and the base end of the knob 14.

Rotation of the rotary operating section 14A disposed at the end of the knob 14 causes electrical switching of the rotary switch 6 provided in the knob 14. An electrical signal produced by this electrical switching is transmitted to the electronic circuit of the vehicle via the lead wire 7, thereby causing switching of, e.g., a motor.

Figure 2:
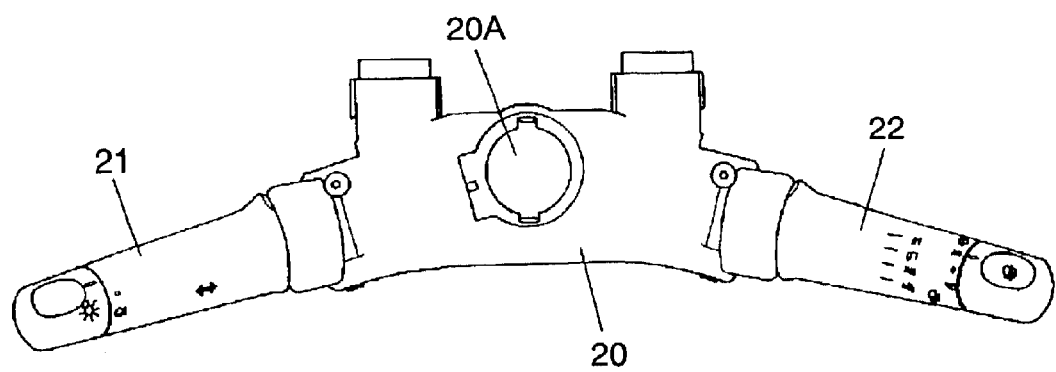
FIG. 2 is a plan view of a composite switch using a pair of the lever switches in accordance with the exemplary embodiment of the present invention.
Figure 3:
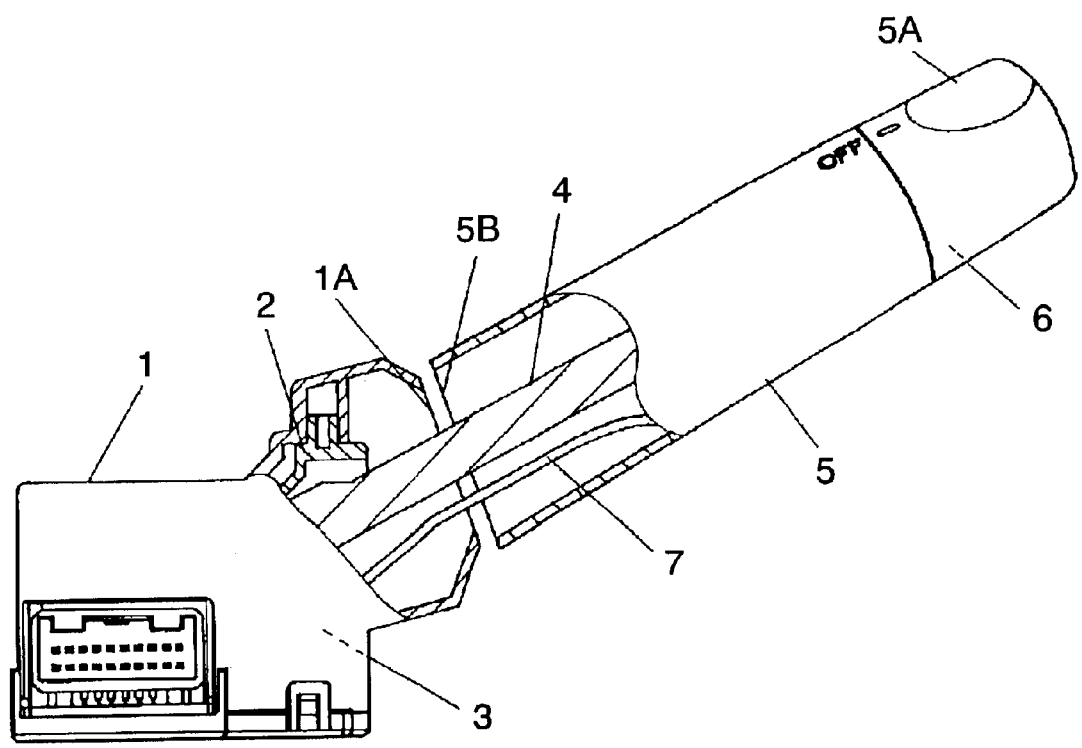
FIG. 3 shows a partial sectional view of a conventional lever switch.

The above-described lever switch is used, for instance, as shown in FIG. 2, where a first lever switch 21 is placed on the left side of a composite switch housing 20 and a second lever switch 22 is placed on the right side of the housing 20, so that a composite switch is constructed.

An opening 20A at the center of the housing 20 receives a shaft (not shown) of a steering wheel of a vehicle, and each one of the lever switches 21, 22 is typically disposed to extend in a radial manner with respect to the rotation center of the steering wheel.

In the foregoing structure, the lever switch 21 or 22 is rocked or the knob provided at the end of the respective lever switch is rotated, thereby, for example, switching the headlights to low beams, activating the blinkers, switching the windshield wipers from intermittent operation to a high-speed or a low-speed operation, switching application of washing fluid from spraying to halting, and the like.

As discussed above, according to this exemplary embodiment, the opening 10A of the housing 10 is covered by the cover 16. One of the side face 16A of the cover 16 and the base end of the knob 14 is protruded like a cup (i.e. is convex) and the other one is recessed like a cup (i.e. is concave). FIG. 1 shows the example in which the side face 16A is convex and the base end of the knob 14 is concave. This structure prevents an operator of the lever from seeing the inside of the housing 10, the cover 16, and the knob 14, or the lead wire 7 running therethrough.

As a result, a good looking lever switch and a composite switch using plural lever switches are obtainable.

The communicating tube 13A is provided on the lever 13 at the location where the cover 16 faces the knob 14, and the lead wire 7 runs through this communicating tube 13A for connecting the electrical elements in the knob 14 to the electrical elements in the housing. 10. This structure secures the lead wire 7 during the rocking operation of the lever 13 and prevents the lead wire 7 from being damaged.

In the foregoing description, the opening 10A of the housing 10 is covered with the cover 16; however, the cover 16 can be incorporated into (i.e., integrated with) the housing, so that the number of components can be reduced and the cost can be lowered. The resin housing is not limited to the illustrated box shape; its shape can be changed depending on design considerations.

What is claimed is:

1. A lever switch arrangement comprising:
   a housing having an opening;
   a slider slidably accommodated in said housing for sliding movement to cause electrical switching within said housing;
   a lever engaged with said slider for causing sliding of said slider, said lever having a base end portion provided in said housing and engaged with said slider, and a distal end portion projecting outwardly from said housing via said opening;
   a cover mounted to said housing to cover said opening thereof; and
   a knob mounted to and surrounding said distal end portion of said lever, said knob having a base end portion facing said cover, and said base end portion of said knob having an opening through which said lever extends;
   wherein one of said cover and said base end portion of said knob is convex toward the other of said cover and said base end portion of said knob, and said other of said cover and said base end portion of said knob is concave toward said one of said cover and said base end portion of said knob, such that said cover and said base end portion of said knob have mutually generally complementary shapes facing each other.

2. The lever switch arrangement according to claim 1, wherein
   said housing and said cover are integrated with each other.

3. The lever switch arrangement according to claim 1, further comprising
   a communicating tube mounted to said lever at a location aligned with a junction between said base end portion of said knob and said cover; and
   an electrical lead wire extending along said lever through said communicating tube and into said housing.

4. The lever switch arrangement according to claim 3, wherein
   said knob further has a distal end portion opposite said base end portion; and
   said knob includes a rotary operating section provided at said distal end portion thereof, said rotary operating section being rotatable relative to a remaining portion of said knob.

5. The lever switch arrangement according to claim 1, wherein
   said knob further has a distal end portion opposite said base end portion; and
   said knob includes a rotary operating section provided at said distal end portion thereof, said rotary operating section being rotatable relative to a remaining portion of said knob.

6. The lever switch arrangement according to claim 1, wherein
   said one of said cover and said base portion of said knob that is convex toward the other of said cover and said base portion of said knob is said cover.

7. A composite switch arrangement comprising: a composite switch housing having a steering wheel shaft opening; and a plurality of lever switches mounted to said composite switch housing and extending radially from a center of said steering wheel shaft opening of said composite switch housing, each of said plurality of lever switches comprising a lever switch housing having an opening, a slider slidably accommodated in said lever switch housing for sliding movement to cause electrical switching within said lever switch housing, a lever engaged with said slider for causing sliding of said slider, said lever having a base end portion provided in said lever switch housing and engaged with said slider, and a distal end portion projecting outwardly from said lever switch housing via said opening, a cover mounted to said lever switch housing to cover said opening thereof, and a knob mounted to and surrounding said distal end portion of said lever, said knob having a base end portion facing said cover, and said base end portion of said knob having an opening through which said lever extends, wherein one of said cover and said base end portion of said knob is convex toward the other of said cover and said base end portion of said knob, and said other of said cover and said base end portion of said knob is concave toward said one of said cover and said base end portion of said knob, such that said cover and said base end portion of said knob have mutually generally complementary shapes facing each other.

8. The composite switch arrangement according to claim 7, wherein for each of said plurality of lever switches, said lever switch housing and said cover are integrated with each other.

9. The composite switch arrangement according to claim 7, wherein each of said plurality of lever switches further comprises a communicating tube mounted to said lever at a location aligned with a junction between said base end portion of said knob and said cover, and an electrical lead wire extending along said lever through said communicating tube and into said lever switch housing.

10. The composite switch arrangement according to claim 9, wherein, for each of said plurality of lever switches, said knob further has a distal end portion opposite said base end portion, and said knob includes a rotary operating section provided at said distal end portion thereof, said rotary operating section being rotatable relative to a remaining portion of said knob.

11. The composite switch arrangement according to claim 7, wherein, for each of said plurality of lever switches, said knob further has a distal end portion opposite said base end portion, and said know includes a rotary operating section provided at said distal end portion thereof, said rotary operating section being rotatable relative to a remaining portion of said knob.

12. The composite switch arrangement according to claim 7, wherein for each of said plurality of lever switches, said one of said cover and said base portion of said knob that is convex toward the other of said cover and said base portion of said knob is said cover.

* * * * *

UNITED STATES PATENT AND TRADEMARK OFFICE
CERTIFICATE OF CORRECTION

PATENT NO. : 6,747,221 B2  Page 1 of 1
APPLICATION NO. : 10/378923
DATED : June 8, 2004
INVENTOR(S) : Takashi Ichimura It is certified that error appears in the above-identified patent and that said Letters Patent is hereby corrected as shown below:

Column 6, claim 7, line 4, "said know" should read --said knob--.

Signed and Sealed this

Sixth Day of March, 2007

JON W. DUDAS
*Director of the United States Patent and Trademark Office*